United States Patent
Johnson et al.

(10) Patent No.: US 9,501,784 B2
(45) Date of Patent: *Nov. 22, 2016

(54) LOCATION-SPECIFIC ADVERTISING

(71) Applicant: Google Inc., Mountain View, CA (US)

(72) Inventors: Leslie Yeh Johnson, Mountian View, CA (US); Sridhar Ramaswamy, Cupertino, CA (US); Zhe Qian, Sunnyvale, CA (US); Mark Rose, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,758

(22) Filed: Jul. 1, 2014

(65) Prior Publication Data
US 2014/0316893 A1 Oct. 23, 2014

Related U.S. Application Data

(63) Continuation of application No. 13/285,832, filed on Oct. 31, 2011, now Pat. No. 8,812,359, which is a continuation of application No. 12/693,274, filed on Jan. 25, 2010, now Pat. No. 8,549,033, which is a (Continued)

(51) Int. Cl.
*G06F 17/30* (2006.01)
*G06Q 30/02* (2012.01)

(52) U.S. Cl.
CPC ....... *G06Q 30/0257* (2013.01); *G06F 17/3087* (2013.01); *G06Q 30/02* (2013.01);

(Continued)

(58) Field of Classification Search
CPC .................. G06Q 30/0257; G06Q 30/0261; G06Q 30/02; G06Q 30/0205; G06Q 30/0242; G06Q 30/0244; G06Q 30/0246; G06Q 30/0254; G06F 17/3087

USPC ...... 707/769, 771, 912, 944; 705/7.11, 7.29, 705/7.35, 14.4, 14.49, 14.55, 14.72, 14.73
See application file for complete search history.

(56) References Cited

U.S. PATENT DOCUMENTS 5,754,939 A 5/1998 Herz et al.
6,091,956 A 7/2000 Hollenberg
(Continued)

FOREIGN PATENT DOCUMENTS

CA 2402047 9/2001
EP 1083504 3/2001
(Continued)

OTHER PUBLICATIONS

Iyengar et al., Distributed Computing Systems, 1998. Proceddings. 18th International Conference on, Year: 1998, pp. 58-65, DOI: 10.1109/ICDCS.1998.679487.*

(Continued)

*Primary Examiner* — Greta Robinson
(74) *Attorney, Agent, or Firm* — Dority & Manning, P.A.

(57) ABSTRACT

The usefulness, and consequently the performance, of advertisements are improved by allowing businesses to better target their ads to a responsive audience. Location information is determined (or simply accepted) and used. For example, location information may be used in a relevancy determination of an ad. As another example, location information may be used in an attribute (e.g., position) arbitration. Such location information may be associated with price information, such as a maximum price bid. Such location information may be associated with ad performance information. Ad performance information may be tracked on the basis of location information. The content of an ad creative, and/or of a landing page may be selected and/or modified using location information. Tools, such as user interfaces, may be provided to allow a business to enter and/or modify location information. The location information used to target and/or score ads may be, include, or define an area.

20 Claims, 9 Drawing Sheets

Related U.S. Application Data continuation of application No. 10/823,508, filed on Apr. 12, 2004, now Pat. No. 7,668,832, which is a continuation-in-part of application No. 10/654,265, filed on Sep. 3, 2003, now Pat. No. 7,680,796.

(52) U.S. Cl.
CPC ...... *G06Q30/0205* (2013.01); *G06Q 30/0242* (2013.01); *G06Q 30/0244* (2013.01); *G06Q 30/0246* (2013.01); *G06Q 30/0254* (2013.01); *G06Q 30/0261* (2013.01)

(56) References Cited

U.S. PATENT DOCUMENTS

| | | | |
|---|---|---|---|
| 6,144,944 | A | 11/2000 | Kurtzman et al. |
| 6,285,987 | B1 | 9/2001 | Roth et al. |
| 6,285,999 | B1 | 9/2001 | Page |
| 6,298,351 | B1 | 10/2001 | Castelli et al. |
| 6,332,127 | B1 | 12/2001 | Bandera et al. |
| 6,343,317 | B1 | 1/2002 | Glorikian |
| 6,381,465 | B1 | 4/2002 | Chern et al. |
| 6,460,034 | B1 | 10/2002 | Wical |
| 6,505,046 | B1 | 1/2003 | Baker |
| 6,522,875 | B1 | 2/2003 | Dowling et al. |
| 6,587,835 | B1 | 7/2003 | Treyz et al. |
| 6,625,456 | B1 | 9/2003 | Busso et al. |
| 6,643,640 | B1 | 11/2003 | Getchius et al. |
| 6,711,474 | B1 | 3/2004 | Treyz et al. |
| 7,047,242 | B1 | 5/2006 | Ponte |
| 7,089,264 | B1 | 8/2006 | Guido et al. |
| 7,100,111 | B2 | 8/2006 | McElfresh et al. |
| 7,136,875 | B2 | 11/2006 | Anderson et al. |
| 7,421,278 | B2 | 9/2008 | Srinivasan et al. |
| 7,668,832 | B2 | 2/2010 | Yeh et al. |
| 7,680,796 | B2 | 3/2010 | Yeh et al. |
| 7,778,872 | B2 | 8/2010 | Kamangar et al. |
| 7,962,363 | B2 | 6/2011 | Patel et al. |
| 8,131,585 | B2 | 3/2012 | Nicolas et al. |
| 8,549,033 | B2 | 10/2013 | Yeh et al. |
| 8,560,388 | B2 | 10/2013 | Yeh et al. |
| 8,812,359 | B2 * | 8/2014 | Yeh et al. ............. 705/14.4 |
| 8,818,856 | B2 | 8/2014 | Yeh et al. |
| 2001/0032122 | A1 | 10/2001 | Hankia |
| 2001/0042054 | A1 | 11/2001 | Dietrich et al. |
| 2001/0042064 | A1 | 11/2001 | Davis et al. |
| 2002/0016741 | A1 | 2/2002 | Black et al. |
| 2002/0044067 | A1 | 4/2002 | Heisin |
| 2002/0049635 | A1 | 4/2002 | Mai et al. |
| 2002/0099605 | A1 | 7/2002 | Weitzman et al. |
| 2002/0103834 | A1 | 8/2002 | Thompson et al. |
| 2002/0161633 | A1 * | 10/2002 | Jacob et al. ............. 705/14 |
| 2003/0046161 | A1 | 3/2003 | Kamangar et al. |
| 2003/0078832 | A1 | 4/2003 | Alvarez et al. |
| 2003/0093318 | A1 | 5/2003 | Komaki et al. |
| 2003/0110080 | A1 | 6/2003 | Tsutani et al. |
| 2004/0010518 | A1 | 1/2004 | Montemer |
| 2004/0030597 | A1 * | 2/2004 | Bibas ............. G06Q 30/02 705/14.43 |
| 2004/0044571 | A1 | 3/2004 | Bronnimann et al. |
| 2005/0021397 | A1 | 1/2005 | Ci et al. |
| 2005/0102177 | A1 * | 5/2005 | Takayama ........ G06Q 30/0241 705/14.4 |
| 2011/0137548 | A1 | 6/2011 | Shen et al. |
| 2012/0109742 | A1 | 5/2012 | Yeh et al. |
| 2012/0109744 | A1 | 5/2012 | Yeh et al. |
| 2012/0116884 | A1 | 5/2012 | Yeh et al. |

FOREIGN PATENT DOCUMENTS

| | | |
|---|---|---|
| EP | 1083504 A2 | 3/2001 |
| EP | 1253542 | 10/2002 |
| JP | 2001-318925 | 11/2001 |
| JP | 2002-24276 | 1/2002 |
| JP | 2003-77000 | 3/2003 |
| JP | 2003-108591 | 4/2011 |
| KR | 2000-59098 | 10/2000 |
| KR | 2002-14897 | 2/2002 |
| WO | 00/54201 | 9/2000 |
| WO | 01/01217 | 1/2001 |
| WO | WO-01/01217 A2 | 1/2001 |
| WO | 01/65426 | 9/2001 |
| WO | WO-01/65426 A1 | 9/2001 |
| WO | 03/102738 | 12/2004 |

OTHER PUBLICATIONS

Examiner's Report No. 2 for Australian Patent Application No. 2004271567, mailed Sep. 29, 2009 (2 pages).

Examiner's Report No. 3 for Australian Patent Application No. 2004271567, mailed Oct. 29, 2009 (2 pages).

Statement on Grounds and Particulars in Support of Opposition for Australian Patent Application No. 2004271567, dated Jun. 24, 2010, 12 pages.

Examiner's Re-Examination Report for Australian Patent Application No. 2004271567, mailed Nov. 3, 2011, 3 pages.

Canadian Office Action to Canadian Patent Application No. 2,537,191, dated Aug. 11, 2010, 7 pages.

Canadian Office Action to Canadian Patent Application No. 2,537,191, dated Apr. 9, 2013, 4 pages.

Notification of the Third Office Action for Chinese Patent Application No. 200480029591.X, dated Nov. 15, 2010 with translation, 3 pages.

Rejection Decision for Chinese Patent Application No. 20480029591.X, mailed Mar. 14, 2011 with translation, 4 pages.

Notification of the Fourth Office Action for Chinese Patent Application No. 200480029591.X, mailed Dec.. 14, 2011 with translation, 4 pages.

Communication for European Patent Application No. 04 781 844.8-1527, mailed on Oct. 24, 2007, 5 pages.

First Examination Report for Indian Patent application No. 1144/CHENP/2006, dates Mar. 20, 2008, 5 pages.

Translation of Japanese Patent Application Publication No. 2000-020433 with drawings, Jan. 21, 2000, 21 pages.

Notices of Reasons for Rejection for Japanese Patent Application No. 2006-525355, mailed Mar. 31, 2009 with translation, 6 pages.

Notice of Preliminary Rejection for Korean Patent Application No. 10-2006-7004465, mailed Nov. 4, 2008, with translation, 7 pages.

Notice of Preliminary Rejection for Korean Patent Application No. 10-2008-7024188, mailed Nov. 27, 2008 with translation, 6 pages.

Office Action to U.S. Appl. No. 10/654,265, mailed May 9, 2006, Paper No. 20060503, 10 pages.

Office Action to U.S. Appl. No. 10/654,265, mailed Jan. 4, 2007, Paper No. 20061227, 11 pages.

Office Action to U.S. Appl. No. 10/654,265, mailed Aug. 24, 2007, Paper No. 20070816, 9 pages.

Office Action to U.S. Appl. No. 10/654,265, mailed May 12, 2008, Paper No. 20080430, 21 pages.

"3G European Location Based Advertising", Public Mid-Term Report, version 1.0, published on Oct. 16, 2003 by the ELBA Consortium, 17 pages.

Brin et al., "The Anatomy of a Large Scale Hypertextual Web Search Engine", Proceedings of the Seventh International Conference on World Wide Web, Brisbane, Australia, Apr. 14-18, 1998, 20 pages.

Bruner, "Sites Help Marketers Think Global, Advertise Local, 'Geo-Coding', Other Tools Make Ads More Relevant", Advertising Age, Mar. 24, 2007, p. 3.

Bunn, "Machine Age, Electioneering", The Village Voice, vol. XLIII, No. 17, Apr. 28, 1998, 3 pages.

Chen et al., "A Survey of Context-Aware Mobile Computing Research", Technical Report TR2000-381, Department of Computer Science, Dartmouth College, 2000, 16 pages.

Cheverst et al., "Developing a Context-Aware Electronic Tourist Guide: Some Issues and Experiences", CHI 2000 Conference on Human Factors in Computing System, The Hague, The Netherlands, Apr. 1-6, 2000, pp. 17-24.

Cheverst et al., "Experiences of Developing and Deploying a Context-Aware Tourist Guide: The GUIDE Project", The Sixth

(56) References Cited

OTHER PUBLICATIONS

Annual International Conference on Mobile Computing and Networking, Boston, Massachusetts, Aug. 6-11, 2000, pp. 20-31.

Clark, "DoubleClick Localizes Web Ads", CNET News.com, Jul. 14, 1998, pp. 1-2.

The Gale Group, "Dollars and Eyeballs: The Net Advertising Equation", Publishing Technology review, vol. 3, No. 10, Nov. 1, 1996, 4 pages.

Gallagher et al., "A Framework for Targeting Banner Advertising on the Internet", Proceedings of the Thirteenth Hawaii International Conference on System Sciences, vol. 4, No. 7, Jan. 7, 1997, pp. 265-274.

Gwertzman, "Autonomous Replication in Wide-Area Internetworks", Center for Research in Computing Technology, Harvard University, Apr. 10, 1995, 103 pages.

Long et al., "Rapid Prototyping of Mobile Context-Aware Applications: The Cyberguide Case Study, Proceedings of the $2^{nd}$ Annual International Conference on Mobile Computing and Networking", White Plains, New York, Nov. 11-12, 1996pp. 97-102.

Morimoto et al., "Extracting Spatial Knowledge from the Web", Proceedings of the 2003 Symposium on Applications and the Internet, Piscataway, New Jersey, Jan. 27-31, 2003, pp. 326-333.

NetGravity AdServer 3.5 Announcement, published on Sep. 9, 1998, 1 page.

NetGravity AdServer AdMaster's Guide, 1999, pp. 1-59.

NetGravity AdServer User Assistance Guide, 1998, pp. 1-329.

\* cited by examiner

320'

330'

LOCATION-SPECIFIC ADVERTISING

§0. RELATED APPLICATIONS

This application is a continuation of U.S. patent application Ser. No. 13/285,832, titled "USING LOCATION-SPECIFIC AD CREATIVES AND/OR AD LANDING PAGES IN AN AD SYSTEM," and filed on Oct. 31, 2011, which is a continuation of U.S. patent application Ser. No. 12/693,274 (referred to as "the '274 application"), titled "USING LOCATION-SPECIFIC PRICE AND/OR PERFORMANCE INFORMATION IN AN AD SYSTEM," filed Jan. 25, 2010, now issued as U.S. Pat. No. 8,549,033, and listing Leslie Yeh, Sridhar Ramaswamy, Zhe Qian and Mark Rose as inventors, the '274 application being a continuation of U.S. patent application Ser. No. 10/823,508 (referred to as "the '508 application"), titled "DETERMINING AND/OR USING LOCATION INFORMATION IN AN AD SYSTEM," filed on Apr. 12, 2004, now issued as U.S. Pat. No. 7,668,832, and listing Leslie Yeh, Sridhar Ramaswamy, Zhe Qian and Mark Rose as inventors, the '508 application being a continuation-in-part of U.S. patent application Ser. No. 10/654,265 (referred to as "the '265 application"), titled "DETERMINING AND/OR USING LOCATION INFORMATION IN AN AD SYSTEM," filed on Sep. 3, 2003, now issued as U.S. Pat. No. 7,680,796, and listing Leslie Yeh, Sridhar Ramaswamy and Zhe Qian as inventors. Each of the above-identified patent applications is expressly incorporated herein by reference.

§1. BACKGROUND OF THE INVENTION

§1.1 Field of the Invention

The present invention concerns advertising. In particular, the present invention concerns improving advertising using location information.

§1.2 Related Art

Advertising using traditional media, such as television, radio, newspapers and magazines, is well known. Unfortunately, even when armed with demographic studies and entirely reasonable assumptions about the typical audience of various media outlets, advertisers recognize that much of their ad budget is simply wasted. Moreover, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Websites" in the specification without loss of generality) as conduits to reach a large audience. Using this first approach, an advertiser may place ads on the home page of the New York Times Website, or the USA Today Website, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Website. An advertiser will normally determine such targeting manually.

Regardless of the strategy, Website-based ads (also referred to as "Web ads") are often presented to their advertising audience in the form of "banner ads"—i.e., a rectangular box that includes graphic components. When a member of the advertising audience (referred to as a "viewer" or "user" in the Specification without loss of generality) selects one of these banner ads by clicking on it, embedded hypertext links typically direct the viewer to the advertiser's Website. This process, wherein the viewer selects an ad, is commonly referred to as a "click-through" ("Click-through" is intended to cover any user selection.). The ratio of the number of click-throughs to the number of impressions of the ad (i.e., the number of times an ad is displayed or otherwise rendered) is commonly referred to as the "click-through rate" or "CTR" of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, etc. Often, if user actions don't indicate a consummated purchase, they may indicate a sales lead, although user actions constituting a conversion are not limited to this. Indeed, many other definitions of what constitutes a conversion are possible. The ratio of the number of conversions to the number of impressions of the ad (i.e., the number of times an ad is displayed or otherwise rendered) is commonly referred to as the conversion rate. If a conversion is defined to be able to occur within a predetermined time since the serving of an ad, one possible definition of the conversion rate might only consider ads that have been served more than the predetermined time in the past.

The hosts of Websites on which the ads are presented (referred to as "Website hosts" or "ad consumers") have the challenge of maximizing ad revenue without impairing their users' experience. Some Website hosts have chosen to place advertising revenues over the interests of users. One such Website is "Overture.com," which hosts a so-called "search engine" service returning advertisements masquerading as "search results" in response to user queries. The Overture.com Website permits advertisers to pay to position an ad for their Website (or a target Website) higher up on the list of purported search results. If such schemes where the advertiser only pays if a user clicks on the ad (i.e., cost-per-click) are implemented, the advertiser lacks incentive to target their ads effectively, since a poorly targeted ad will not be clicked and therefore will not require payment. Consequently, high cost-per-click ads show up near or at the top, but do not necessarily translate into real revenue for the ad publisher because viewers don't click on them. Furthermore, ads that viewers would click on are further down the list, or not on the list at all, and so relevancy of ads is compromised.

Search engines, such as Google for example, have enabled advertisers to target their ads so that they will be rendered in conjunction with a search results page responsive to a query that is relevant, presumably, to the ad. Although search result pages afford advertisers a great opportunity to target their ads to a more receptive audience, search result pages are merely a fraction of page views of the World Wide Web.

Some online advertising systems may use ad relevance information and document content relevance information (e.g., concepts or topics, feature vectors, etc.) to "match" ads to (and/or to score ads with respect to) a document including content, such as a Web page for example.

The foregoing ad serving systems can be thought of as keyword-targeted systems (where ads are targeted using terms found in a search query) and content-targeted systems (where ads are targeted using content of a document). Although keyword-targeted and content-targeted ad systems have improved the usefulness of ads, and consequently their performance (e.g., in terms of click-through rate, conversion rate, etc.), there is still plenty of room for improvement. Such improvement can be expected with better targeting.

The Google keyword ad server allows advertisers to specify (e.g., for purposes of targeting) one or more countries in which their ad may be served. This permits ads to be served to particular users who presumably speak and understand a particular language. Unfortunately, however, many businesses have only a regional or local reach. For example, a restaurant may want to target ads only to potential customers within a 30 minute drive. A dry cleaner may want to target ads only to potential customers in the same town, and perhaps a few neighboring towns. As another example, a regional chain of drug stores may only want to target ads to potential customers living within their region. Even if such businesses have ads that are relevant to a search query or a Web page, if the end user viewing a search results Web page or the content of a Web page is outside the geographic reach of their business, the ads will not be very useful and will not perform well. If ads only generate revenue (e.g., for a content owner or ad system) when they perform well (e.g., if they are selected), such ads will generate little, if any, revenue.

Such businesses often advertise in local papers and the telephone book yellow pages. While such conduits for advertisements are useful, they are limited. Such businesses may also advertise on local Websites, but this requires the business to find local Websites, and to track and manage advertising on each of the Websites.

In view of the foregoing, there is a need for improving the usefulness, and consequently the performance, of advertisements. In particular, there is a need to allow businesses to better target their ads to a responsive audience.

§2. SUMMARY OF THE INVENTION

The present invention improves the usefulness, and consequently the performance, of advertisements. The present invention allows businesses to better target their ads to a responsive audience. The present invention may do so by considering location-specific price and/or performance information.

The present invention may also use location-specific price and/or performance information when determining a relevancy score of an ad.

The present invention may also use location-specific price and/or performance information in an attribute (e.g., position) arbitration.

The present invention may also track ad performance information on the basis of location information.

The present invention may select or modify the content of an ad creative, and/or of a landing page using location information. For example, location information may be inserted into an ad creative. As another example, different landing pages with different content can be used for different locations.

The present invention may also provide tools, such as user interfaces, to allow a business to enter and/or modify location information, such as location information used for targeting and location-specific price information.

§3. BRIEF DESCRIPTION OF THE DRAWINGS

§4. DETAILED DESCRIPTION

The present invention may involve novel methods, apparatus, message formats, and/or data structures for obtaining and using geolocation information in an ad system. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as any patentable subject matter described.

In the following, environments in which, or with which, the present invention may operate are described in §4.1. Then, exemplary embodiments of the present invention are described in §4.2. Finally, some conclusions regarding the present invention are set forth in §4.3.

§4.1 Environments in which, or with which, the Present Invention may Operate

§4.1.1 Exemplary Advertising Environment

Figure 1:
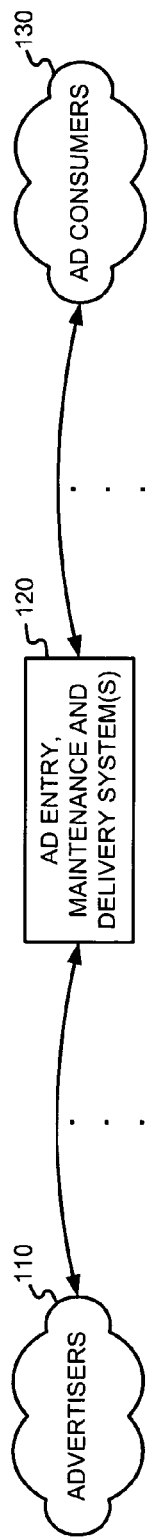
FIG. 1 is a high-level diagram showing parties or entities that can interact with an advertising system.

FIG. 1 is a high level diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

Figure 2:
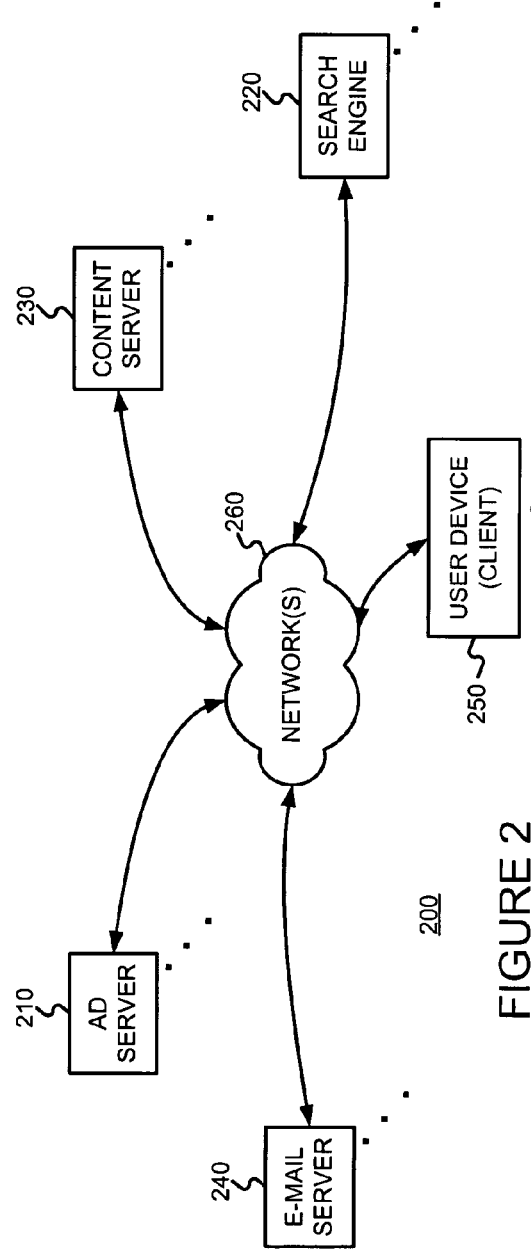
FIG. 2 is a diagram illustrating an environment in which, or with which, the present invention may operate.

The ad server 120 may be similar to the one described in FIG. 2 of U.S. patent application Ser. No. 10/375,900 (incorporated herein by reference), entitled "SERVING ADVERTISEMENTS BASED ON CONTENT," filed on Feb. 26, 2003 and listing Darrell Anderson, Paul Bucheit, Alex Carobus, Claire Cui, Jeffrey A. Dean, Georges R. Harik, Deepak Jindal, and Narayanan Shivakumar as inventors. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line have one or more ad groups, each containing one or more ads. Each ad group may include targeting information (e.g., a set of keywords, a set of one or more topics, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user.). Each ad may also include a link to a URL (e.g., a landing Web page, such as the home page of an advertiser, or a Web page associated with a particular product or server). Consistent with the present invention, the ad information may include geolocation targeting information, geo-location performance information, and/or geolocation price information Naturally, the ad information may include more or less information, and may be organized in a number of different ways.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, etc.), an e-mail facility (e.g., Outlook from Microsoft), etc. A search engine 220 may permit user devices 250 to search collections of documents (e.g., Web pages). A content server 210 may permit user devices 250 to access documents. An e-mail server (such as Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in U.S. patent application Ser. No. 10/375, 900 (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc. Consistent with the present invention, the request may also include geolocation information, such as location information about an end user that submitted a search query.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where (such as geolocation information) the ads are to be rendered (e.g., position, click-through or not, impression time, impression date, size, conversion or not, etc.) back to the ad server 120/210. Alternatively, or in addition, such information may be provided back to the ad server 120/210 by some other means. Consistent with the present invention, the ad server 120/210 may store ad performance information on the basis of geolocation information.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc. Consistent with the present invention, the request may also include geolocation information, such as location information about an end user that submitted a search query.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

Finally, the search engine 220 may transmit information about the ad and when, where (e.g., geolocation), and/or how the ad was to be rendered (e.g., position, click-through or not, impression time, impression date, size, conversion or not, etc.) back to the ad server 120/210. Alternatively, or in addition, such information may be provided back to the ad server 120/210 by some other means. Consistent with the present invention, the ad server 120/210 may store ad performance information on the basis of geolocation information.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under over, or otherwise in association with an e-mail.

Although the foregoing examples described servers as (i) requesting ads, and (ii) combining them with content, one or both of these operations may be performed by a client device (such as an end user computer for example).

§4.1.2 Definitions

"Geolocation information" may include information specifying one or more of one or more countries, one or more (inter-country) regions, one or more states, one or more metro areas, one or more cities, one or more towns, one or more boroughs, one or more areas with common zip codes, one or more areas with common telephone area codes, one or more areas served by common cable head end stations, one or more areas served by common network access points or nodes, one or more geographic areas defined by some other means, etc. It may include latitude and/or longitude, or a range thereof. Thus, for example, it may be or include an area defined by a geographic reference point and perhaps some additional information, such as a circular area of a defined radius about a point defined by latitude and longitude coordinates for example. As another example, it may be an area defined by three or more geographic reference points, such as a triangle, rectangle, pentagon, or some other polygon defined by a number of geographic reference points for example. It may include information, such as an IP address, from which a user location can be estimated.

Online ads, such as those used in the exemplary systems described above with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. Depending on the type of online ad, ad features may include one or more of the following: text, a link, an audio file, a video file, an image file, executable code, embedded information, etc.

When an online ad is served, one or more parameters may be used to describe how, when, and/or where the ad was served. These parameters are referred to as "serving parameters" below. Serving parameters may include, for example, one or more of the following: features of (including information on) a page on which the ad was served, a search query or search results associated with the serving of the ad, a user characteristic (e.g., their geolocation, the language used by the user, the type of browser used, previous page views, previous behavior), a host or affiliate site (e.g., America Online, Google, Yahoo) that initiated the request, an absolute position of the ad on the page on which it was served, a position (spatial or temporal) of the ad relative to other ads served, an absolute size of the ad, a size of the ad relative to other ads, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain geolocation, etc. As another example, in some systems, an advertiser may specify that its ad is to be served only if a page or search query includes certain keywords or phrases. As yet another example, in some systems, an advertiser may specify that its ad is to be served only if a document being served includes certain topics or concepts, or falls under a particular cluster or clusters, or some other classification or classifications.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a Realnetworks streaming audio file player, etc.), a viewer (e.g., an Abobe Acrobat pdf reader), etc.

A "content owner" is a person or entity that has some property right in the content of a document. A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary.

"User information" may include user behavior information and/or user profile information. It may also include a user's geolocation, or an estimation of the user's geolocation.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Various exemplary embodiments of the present invention are now described in §4.2.

§4.2 Exemplary Embodiments

Figure 3:
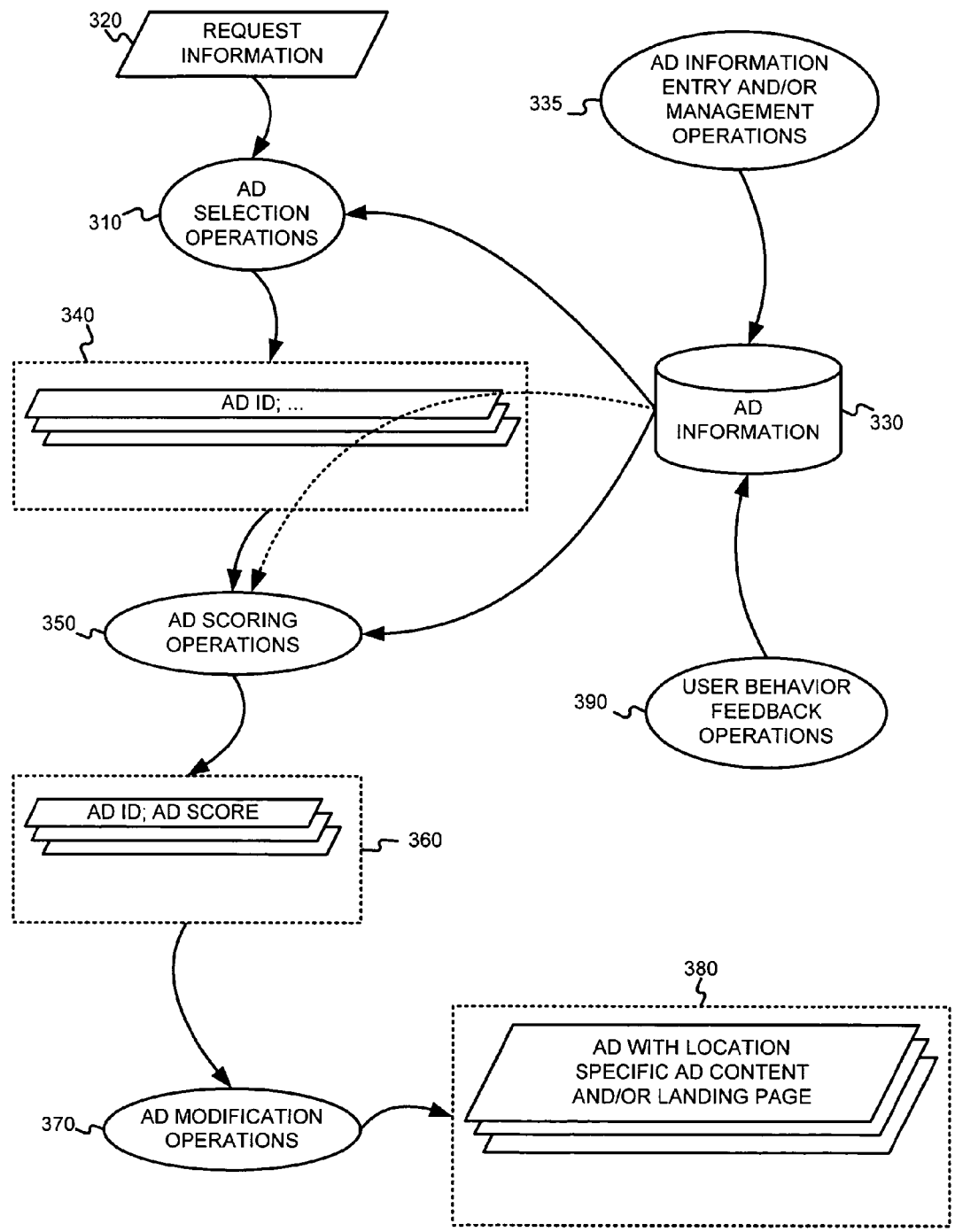
FIG. 3 is a bubble diagram illustrating various operations that may be performed, and various information that may be used and/or generated, by the present invention.

FIG. 3 is a bubble diagram illustrating various operations that may be performed by the present invention, and various information that may be used and/or generated by the present invention. An ad selection operation 310 may be used to generate a set of ads 340 using ad information 330 and request information 320. In an exemplary embodiment of the present invention, the set of ads 340 may include ads relevant to the request information 320. For example, if the request information 320 is associated with a search query, the ads 340 may be relevant to terms of the search query. Alternatively, if the request information 320 is associated with a document to be served, the ads 340 may be relevant to content of the document. In any event, the request information 320 may include geolocation information. For example, the request information 320 may include geolocation of an end user that submitted a search query or document request (or some other entity, such as a cable head end, a network access point, etc., associated with the request), or information from which such geolocation information can be derived. Exemplary data structures that may be used to store request information 320 and ad information 330 are described in §4.2.1 below with reference to FIGS. 4 and 5, respectively. Exemplary methods that may be used to perform the ad selection operation 310 are described in §4.2.2 below with reference to FIG. 6.

Still referring to FIG. 3, a scoring operation 350 may be used to generate a set 360 of ads and associated scores using the first set 340 of ads and ad information 330. The scoring operation 350 may consider geolocation information, such as geolocation performance information, and/or geolocation price information for example, of the ads. Exemplary methods that may be used to perform the scoring operation 350 are described in §4.2.2 below with reference to FIG. 7.

Ad modification operations 370 may be used to generate a set 380 of ads with location specific creative content, and/or a location specific landing page from the set 360 of ads. Although not shown, the ad modification operations 370 may use geolocation information. Exemplary methods that may be used to perform the ad modification operations 370 are described in §4.2.2 below with reference to FIG. 8.

The ad information 330 may include geolocation-based performance information. Such information may be provided, and/or tracked by user behavior feedback operations 390. Exemplary methods that may be used to perform the user behavior feedback operations are described in §4.2.2 below with reference to FIG. 9.

Finally, the ad information 330 may include geolocation targeting, and/or geolocation price information. This information may be entered and/or modified by advertisers, or their representatives via ad information entry and/or management operations 335. Exemplary methods that may be used to perform these operations 335 are described in §4.2.2 below with reference to FIG. 10.

The present invention need not provide, and/or use all of the operations and information described with reference to FIG. 3. The present invention need not perform the operations in the order shown. Finally, the present invention may combine, or separate functionality described with respect to the various operations. For example, the selection and scoring operations 310 and 350 may be combined into a single operation.

§4.2.1 Exemplary Data Structures

Figure 4:
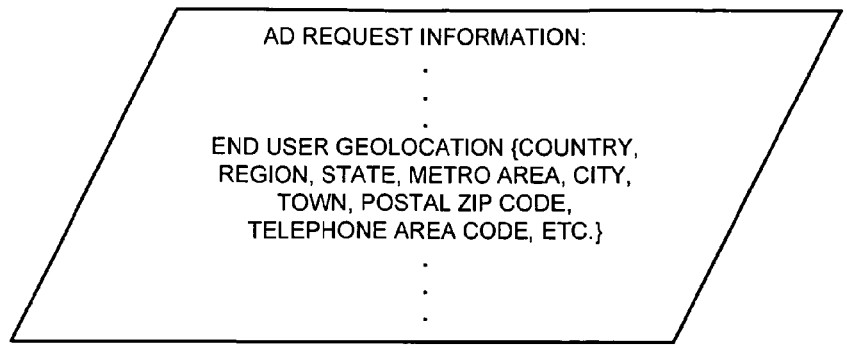
FIG. 4 illustrates exemplary request information that is consistent with the present invention.

FIG. 4 illustrates exemplary ad request information 320' that is consistent with the present invention. The ad request information 320' may include information such as that described in §4.1.1 above. Further, the ad request information may include end user (or some other entity, simply referred to as "end user" in the specification) geolocation information, or information from which end user geolocation can be derived or estimated. For example, the end user geolocation information may include one or more of a country, a region (e.g., pacific coast, north-east, mid-Atlantic, south-west, etc.), a state, a metro area (e.g., San Francisco Bay Area, Metro District of Columbia Area, etc.), a city, a town, a postal zip code, a telephone area code, etc.

The geolocation information may be encoded in various ways. For example, a country identifier may be a two character code such as those determined by the International Organization for Standardization ("ISO"). The region identifier may be a six character code such as those determined by UTF8. Thus, the country and region can be encoded using the ISO 3166-2/1999 standard which is a two letter country code followed by a "-" and 1-3 alphanumeric characters. The ISO 3166-2/1999 standard code can be mapped to a numerical identifier (e.g., in the range of 20001-30000). New regions can be assigned a numerical identifier appended to the end. In one embodiment of the present invention, more than 200 countries and 1300 regions are uniquely identified. The metro area identifier may be based on the DMA standard. In one embodiment, metro areas can cross state lines. Accordingly, in such an embodiment, a metro area is not necessarily "contained" within a state. Since the same city or town name can be used for different cities or towns in different states, such information should be used in combination with state information to avoid ambiguity. Postal zip codes can be encoded as a 5-digit integer, or extended with 4 or more digits. Telephone area codes may be encoded as a three-digit integer. Other ways of encoding geolocation information are possible.

The present invention may be used to derive or estimate geolocation information from other information. For example, the present invention may use known techniques (such as that used by the "NetAcuity" product from Digital Envoy of Norcross, Ga.) to map Internet protocol ("IP") address and/or domain information to geolocation information. As another example, Internet service providers may have many dial-in access servers, each associated with a telephone area code. As yet another example, an end user's location might be inferred from a regional term (e.g., hoagie, hero, grinder, sub) entered by the user. If multiple factors are used to infer geolocation, but lead to inconsistent locations, each without a desired level of confidence, a more general, consistent location, can be used. Alternatively, the present invention may simply accept previously derived or provided geolocation information. For example, the end user, or a client device used by the end user, may have voluntarily provided geolocation information. As another example, the geolocation information may have been derived and provided by a third party.

Figure 5:
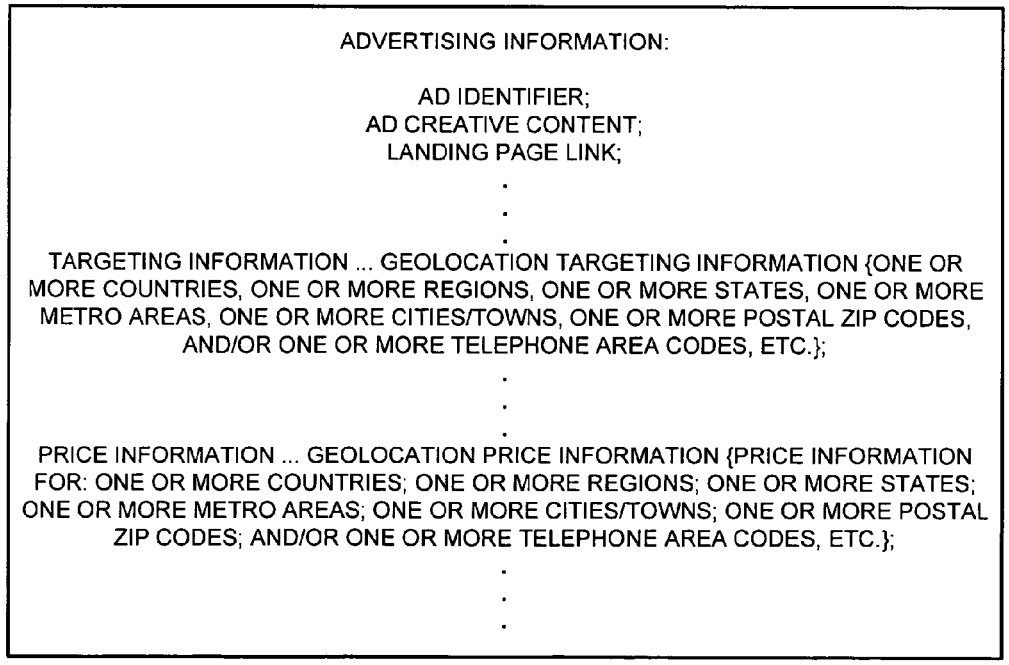
FIG. 5 illustrates exemplary ad information that is consistent with the present invention.

FIG. 5 illustrates exemplary ad information 330' that is consistent with the present invention. The ad information 330' may include information such as that described in §4.1.1 above. For example, the ad information 330' may include a unique ad identifier, ad creative content (or a pointer to such creative content), and/or a landing page link, etc. Further, the exemplary ad information 330' may include at least one of geolocation targeting information and geolocation price information. Geolocation performance information (not shown) may be tracked and associated with the ad.

Geolocation targeting information may include one or more countries, one or more regions, one or more states, one or more metro areas, one or more cities, one or more towns, one or more postal zip codes, and/or one or more telephone area codes, etc. Thus, for example, a business selling irrigation systems can target its ads to the states California, Nevada, Arizona and New Mexico, while a business selling snow blowers can target its ads to states, such as Maine and Minnesota for example, with relatively significant snowfall. A dry cleaner can target its ads to the town in which it is located, as well as neighboring towns, and/or various postal zip codes, and/or various telephone area codes. A professional sports team can target ads for tickets and/or merchandise to a metro area. A national shipping company can target its ads to a country. Geolocation targeting information may also be or include an area (or areas) defined by at least one geographic reference point and perhaps some additional information, such as a circular area of a defined radius about a point defined by latitude and longitude coordinates for example, an elliptical area defined by two geographic reference points and a defined distance sum, etc. As another example, geolocation targeting information may be or include an area (or areas) defined by three or more geographic reference points, such as a triangle, rectangle, pentagon, or some other polygon defined by a number of reference points for example.

Geolocation price information may include price information for each of one or more countries, one or more regions, one or more states, one or more metro areas, one or more cities, one or more towns, one or more postal zip codes, and/or one or more telephone area codes, etc. Geolocation price information may also include price information for an area (or areas) defined using at least one geographic reference point and perhaps some additional information. The price information should correspond to the geolocation targeting information.

In one embodiment of the present invention, geolocation targeting information can be inferred from geolocation price information. For example, if an advertiser submits a maximum bid per impression of $ 1.50 for the geolocation DC metro, it may be assumed that the advertiser wants to target its ads to end users in the DC metro area. Similarly, if the advertiser submits a bid per impression of $ 0.00 for a given state, it may be assumed that the advertiser wants to avoid serving its ads to end users in the state. For example, if a car insurance provider is licensed to provide insurance in all states except for New Jersey, and is not as interested in writing less profitable policies in Florida, it can provide the following geolocation price information:

United States: $1.00/impression;
New Jersey: $0.00/impression; and
Florida: $0.15/impression.

As will be described in more detail with reference to FIG. 7 below, a scoring operation 350 may weigh more specific geolocation price information more than less specific geolocation price information.

§4.2.2 Exemplary Methods

Figure 6:
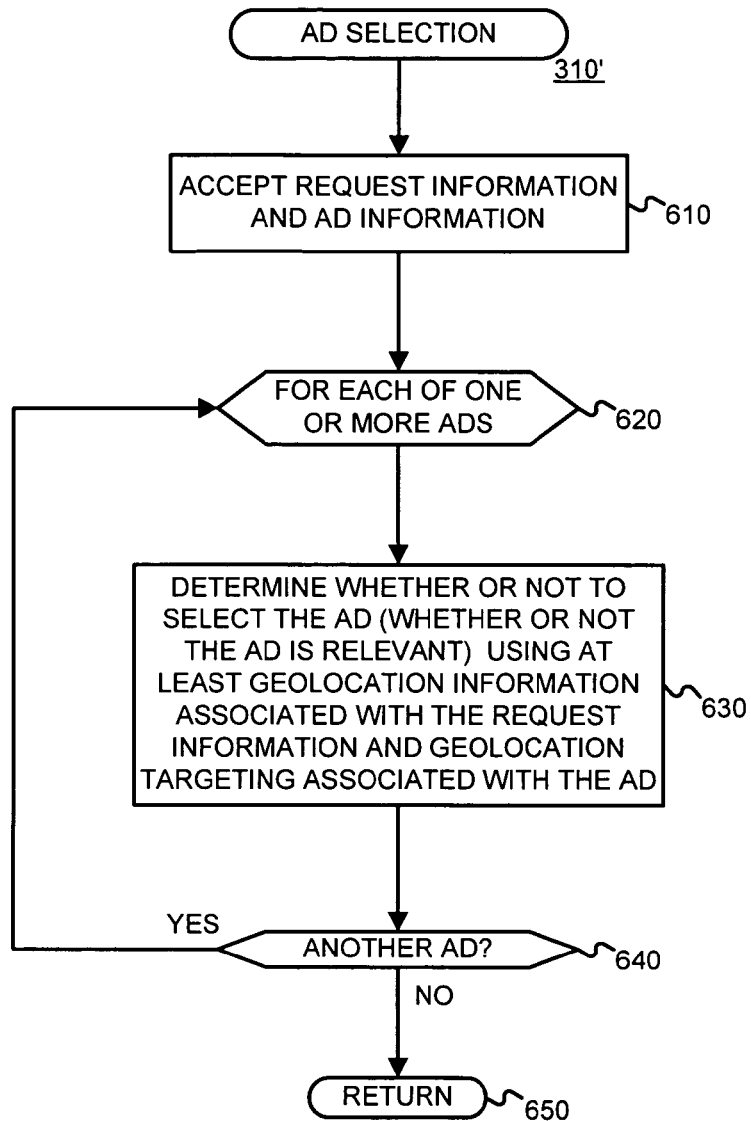
FIG. 6 is a flow diagram of an exemplary method for performing an ad selection operation in a manner consistent with the present invention.

FIG. 6 is a flow diagram of an exemplary method 310' for performing a ad selection operation 310 in a manner consistent with the present invention. Request information and ad information is accepted. (Block 610) The request information may include, among other things, end user geolocation information. The advertising information may include, among other things, geolocation targeting information. As indicated by loop 620-640, an act is performed for each of one or more ads. More specifically, a relevancy measure of the ad is determined using at least geolocation information associated with the request information and geolocation targeting information associated with the ad. (Block 630) After each of the one or more ads have been processed, the method 310' is left. (Node 650)

The relevancy of the ad may be determined using keyword targeting information associated with the ad, ad relevance information associated with the ad, etc. In any event, the relevancy of the ad may be determined using, at least, geolocation information of the request and the ad. The more specific the geolocation information that matches, the more relevant, at least in terms of location, the ad is. Thus, for example, if an end user submitted a search query from San Diego, assuming all other relevancy factors are equal, an ad with geotargeting for San Diego may be more relevant than an ad with geotargeting for California, which may be more relevant for an ad with geotargeting for the West Coast, which may be more relevant for an ad with geotargeting for the United States.

Naturally, geolocation targeting may be just one of a number of relevancy factors. For example, ad relevancy may also consider (a) a comparison of ad relevancy information to the content of a document requested, (b) ad keyword targeting with respect to terms of a search query, (c) user demographic information, (d) user behavior information, (e) time/date/season targeting information, etc.

Figure 7:
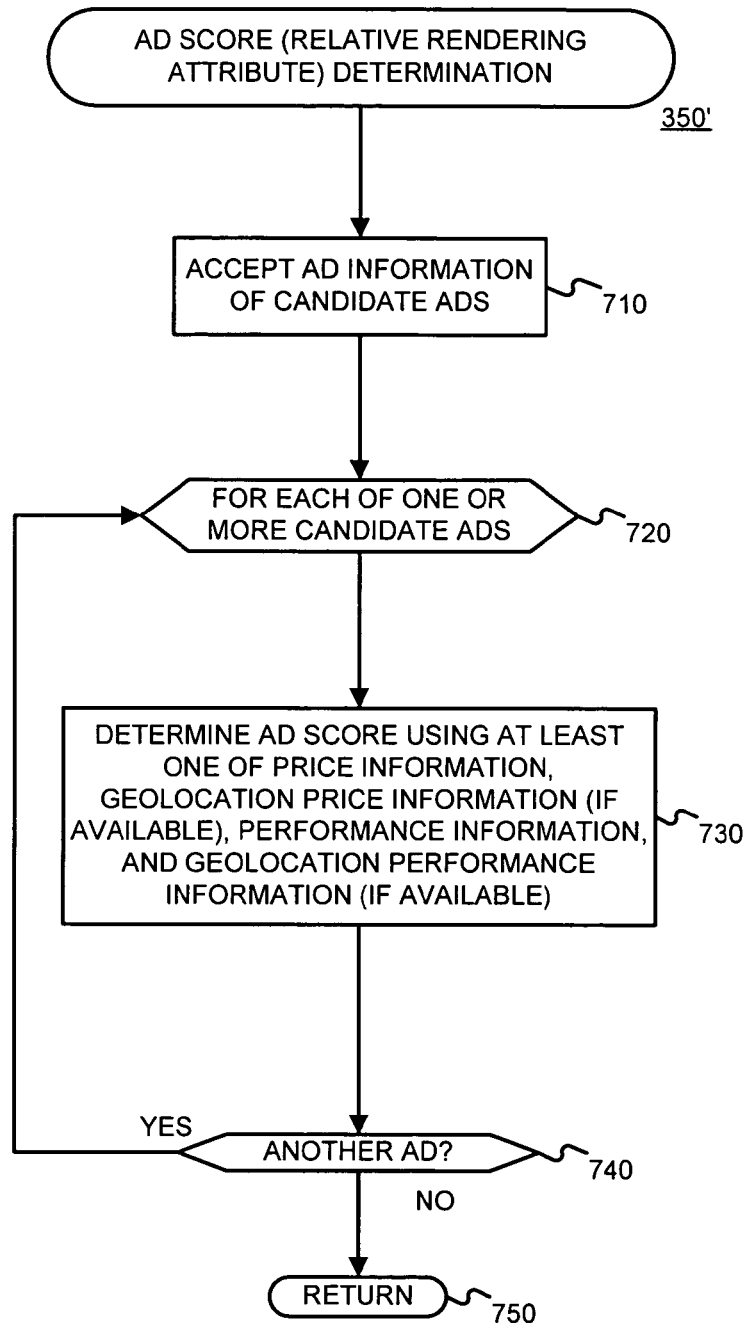
FIG. 7 is a flow diagram of an exemplary method for performing a scoring operation in a manner consistent with the present invention.

FIG. 7 is a flow diagram of an exemplary method 350' for performing a scoring operation 350 in a manner consistent with the present invention. The second score may be used to determine a relative presentation attribute (e.g., size, position, color, volume, etc.) of the ad. Ad information of candidate ads is accepted. (Block 710) As indicated by loop 720-740, an act is performed for each of one or more ads. More specifically, an ad score is determined using at least one of price information, geolocation price information (if available), performance information, and geolocation performance information (if available). (Block 730) Once all of the candidate ads are processed, the method 350' is left. (Node 750)

There are a number of ways to determine an ad score consistent with block 730. A few exemplary ways are described below. If an ad system wants to maximize revenue, it may determine a score by multiplying a price per performance value by the performance of the ad. For example, it may determine cost per click*click-through rate, or cost per conversion*conversion rate. Prices may be discounted or adjusted. The present invention can advantageously use geolocation information, if available, to improve a revenue estimate. For example, suppose the end user to whom the ad will be directed is located in San Diego. Suppose further that the following otherwise equally relevant ads have the associated information shown:

Ad A: max cost per click=$0.25;
   max cost per click=$1.00 in San Diego;
   CTR=0.02 in United States;
   CTR=0.04 in California;
   CTR=0.20 in San Diego.
Ad B: max cost per click=$0.50;
   max cost per click=$2.00 in Florida;
   CTR=0.07 in United States;
   CTR=0.02 in California;
   CTR=0.02 in San Diego.

Without geolocation scoring, a simple product score for ad A would be 0.0050 (=0.25*0.02), while that for ad B would be 0.0350 (=0.50*0.07). With geolocation scoring, a simple product score for ad A would be 0.20 (=1.00*0.20), while that for ad B would be 0.01 (=0.50*0.02). Thus, without geolocation information, ad B would score higher than ad A, but with geolocation information ad A would score higher than ad B. For example, ad A may be for a restaurant in San Diego, while ad B might be for a pool construction company with a large presence in Florida. By using geolocation information, the present invention may advantageously serve ad A with some preference over ad B since it may normally be more useful for an end user in San Diego.

In one embodiment of the present invention, if more specific geolocation price information is not available, more general geolocation price information may be used in the determination of a score. Similarly, if more specific geolocation performance information is not available, more general geolocation performance information may be used. Thus, for example, an ad with only geolocation price and performance information for California may compete with an ad with geolocation price and performance information for Sacramento when serving an ad request with Sacramento geolocation information.

Figure 8:
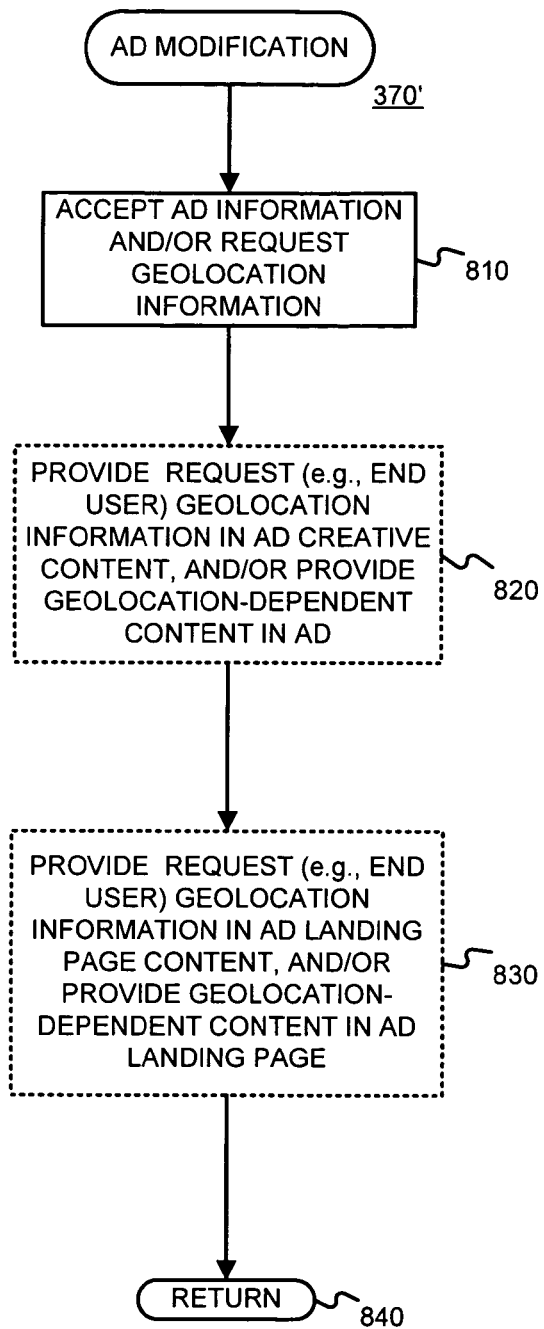
FIG. 8 is a flow diagram of an exemplary method for performing an ad modification operation in a manner consistent with the present invention.

FIG. 8 is a flow diagram of an exemplary method 370' for performing an ad modification operation 370 in a manner consistent with the present invention. Ad information and/or request geolocation information is accepted. (Block 810) Request geolocation information may be provided in the creative content of the ad, and/or the ad may be provided with geolocation-dependent content (e.g., one of a number of candidate ad marketing messages may be selected using geolocation information). (Block 820) Alternatively, or in addition, request geolocation information may be provided in the content of a landing page, and/or geolocation-dependent content may be provided in the ad landing page (e.g., one of a number of candidate landing pages may be selected using geolocation information). (Block 830)

Referring back to block 820, the content of an ad creative may be modified by modifying text or by selecting one of a number of candidate texts. For example, assume that an ad request indicated that the end user is in Tampa Fla., and assume that an ad for a Honda Car Dealer was targeted to Tampa Fla. The normal ad creative may read, "Attention Car Buyers . . . Best Prices on Accords . . . Hundreds in Stock." The modified ad creative may read, "Attention Tampa Car Buyers . . . Best Prices on Accords in Tampa." The geolocation information may simply be added to, or replace a portion of, the ad creative. The geolocation information may be used to select a number of candidate ad creatives.

Referring back to block 830, the one of a plurality of ad landing pages may be selected based on geolocation information. For example, if the geolocation information of the request indicates that the end user is local, a retailer may have a landing page emphasizing the message "Visit our Local Showroom to see the latest merchandize." If, on the other hand, the geolocation information of the request indicates that the end user is remote, a retailer may have a landing page emphasizing "Best Prices on the Web. Free Shipping through the end of July."

Alternative or in addition to generating creative content targeted towards a specific location (e.g., "Find this at Office Depot on San Antonio Road/El Camino"), advertisement attributes may be determined using location information. For example, pricing can be determined using "local" competition, local demographics (e.g. income by zip code), or local buying habits. Prices and/or products may be specific to a location (e.g. a query for "NYC" yields an ad "Fly to JFK from SFO for $199").

Thus, by using geolocation information, the present invention can be used to adapt a marketing message to the location of an end user to perceive the ad.

Figure 9:
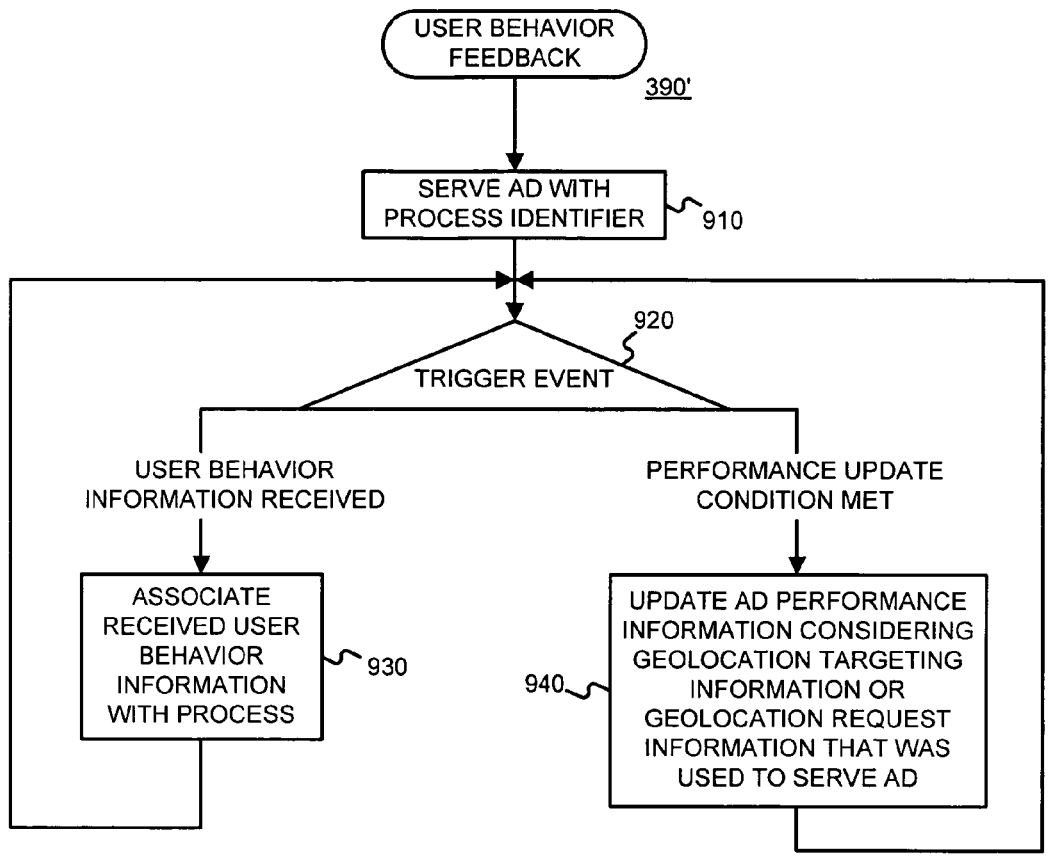
FIG. 9 is a flow diagram of an exemplary method of performing user behavior feedback operations in a manner consistent with the present invention.

FIG. 9 is a flow diagram of an exemplary method 390' for performing user behavior feedback operation 390 in a manner consistent with the present invention. Recall from scoring operation 350 that geolocation specific performance information may be used in determining a score for an ad. The method 390' of FIG. 9 is one way to track such information. Each time an ad is served, this event may be identified by a unique process identifier (e.g., ad server IP address, a date and a time of day). The process identifier may be associated with any geolocation targeting information used when serving the ad, or geolocation information of the relevant request. The ad may be served with its process identifier. (Block 910) As indicated by event block 920, different branches of the method 390' may be performed in response to different events. For example, if user behavior information is received, the received user behavior information is associated with the process identifier (and therefore the geolocation information, if any, used when originally serving the ad) (Block 930) before the method 390' branches back to event block 920. If a condition for updating performance information is met (e.g., the receipt of performance information, the receipt of a certain amount of performance information, a time expiration since the last update, an absolute time/date, etc), the ad performance information is updated considering geolocation targeting information, or geolocation request information associated with the ad serving process (Block 940), before the method 390' branches back to event block 920.

Thus, the method 390' can be used to track ad performance information accounting for geolocation information that may have been used when serving the ad. Various alternative ways of associating geolocation information with performance information are possible.

Figure 10:
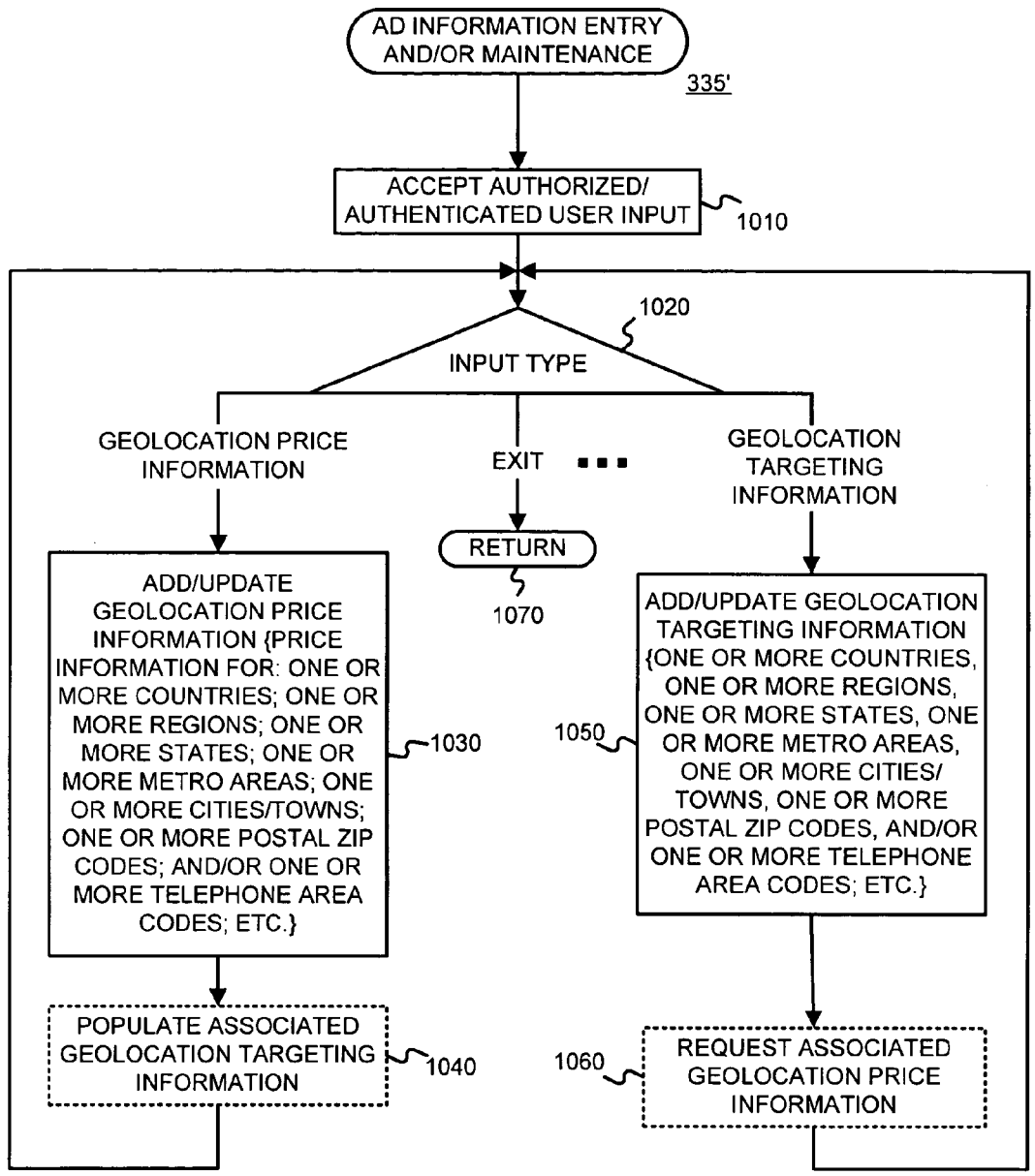
FIG. 10 is a flow diagram of an exemplary method for performing ad information entry and/or management operations in a manner consistent with the present invention.

FIG. 10 is a flow diagram of an exemplary method 335' of performing ad information entry and/or management operations in a manner consistent with the present invention. Recall from FIG. 5 that ad information 330' may include one or more of geolocation targeting information and geolocation price information. The method 330' accepts authorized and/or authenticated user input. (Block 1010) As indicated by event block 1020, various branches of the method 335' may be performed in response to various input types. If the user inputs geolocation price information, geolocation price information is added or updated. (Block 1030) Associated geolocation targeting information may also be populated or revised in accordance with the price information. (Block 1040) For example, if a user enters a maximum price per click of $0.80 for California, and if the ad does not include geolocation targeting for California, such information may be added. If the user later changes this maximum price per click for California to $0.00, the geolocation targeting for California may be turned off or removed. Referring back to block 1020, if the user inputs geolocation targeting information, the geolocation targeting information is added or updated. (Block 1050) Associated geolocation price information may be requested (Block 1060) but need not be provided.

In one embodiment of the present invention, the advertiser user interface can be location specific.

In one embodiment of the present invention, if an advertiser inputs geolocation targeting information, it may be advisable to have them remove location modifiers used in keyword targeting.

In one embodiment of the present invention, advertisers may be limited in the number and/or combination of types of geolocation information entered.

Other features of the advertiser user interface may be provided to make entering and/or managing advertising information more convenient. For example, if any advertiser has an existing campaign, but wants to add a geolocation targeted campaign, bulk importing support may be provided so that the advertiser does not need to re-enter common advertising information. Help features may be used to suggest additional geolocation information (more of the same type, more specific, more general, etc.) in response to entered geolocation information. For example, if the advertiser enters a postal zip code, they may be provided with one or more towns, regions, etc.

§4.2.3 Exemplary Apparatus

Figure 11:
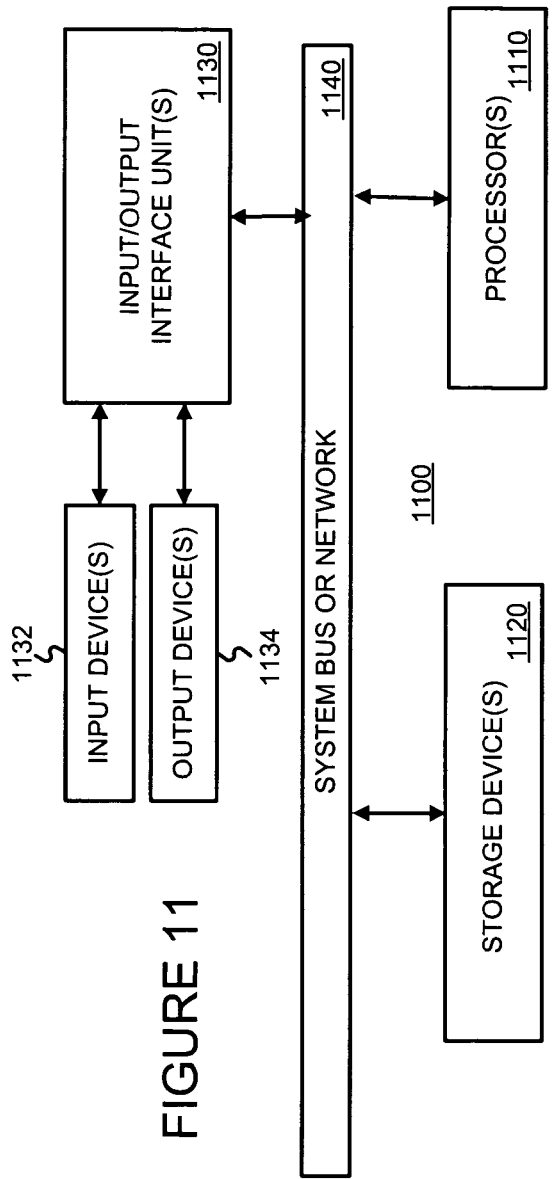
FIG. 11 is a block diagram of an exemplary apparatus that may perform various operations in a manner consistent with the present invention.

FIG. 11 is high-level block diagram of a machine 1100 that may perform one or more of the operations discussed above. The machine 1100 basically includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130.

The one or more processors 1110 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1120 and/or may be received from an external source via one or more input interface units 1130.

In one embodiment, the machine 1100 may be one or more conventional personal computers. In this case, the processing units 1110 may be one or more microprocessors. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1132, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1110 through an appropriate interface 1130 coupled to the system bus 1140. The output devices 1134 may include a monitor or other type of display device, which may also be connected to the system bus 1140 via an appropriate interface. In addition to (or instead of) the monitor, the personal computer may include other (peripheral) output devices (not shown), such as speakers and printers for example.

§4.2.4 Alternatives

Different geolocation information may have different scope, and some geolocation information may contain other geolocation information. Generally, for purposes of determining ad relevancy, a match of more specific geolocation information (e.g., town) may be weighted more heavily than a match of less specific geolocation information (e.g., country). Generally, for purposes of ad scoring, the most specific geolocation price and/or performance information that matches will be used. That is, if an ad has price and performance information for both San Diego and California, if the request geolocation information indicates an end user in San Diego, the San Diego price and performance information will be used. If on the other hand, the request geolocation information indicates an end user in Sacramento, the California price and performance information will be used. If the request geolocation information indicates an end user in Omaha, Nebr., neither will be used.

There are many different ways to score ads. Some examples include (a) using a distance between a presence of the advertiser and the end user, (b) using a local availability of an item sought by the end user, (c) using an advertiser attributes (e.g. a location of the advertiser's closest retail outlet), etc. Ads can be ordered and/or priced using language criteria (e.g., query/display language, information derived about user or advertiser's language such as location of user in Japantown).

Although some examples above used geolocation information as a current location of the user, the geolocation information may be a location that the user is interested in. For example, if a search query includes a zip code, it may be inferred that the user is interested in a location defined by the zip code, or located within in the zip code. If the search query includes a city name, region name, and/or a state name, it may be inferred that the user is interested in a location defined by such a name(s). Thus, for example, a user may be interested in an area which may be the same as, or different from, the current area of the user. The targeting, scoring, content, and/or performance tracking of ads may be affected using a location of interest.

§4.3 Conclusions

In view of the foregoing, the present invention allows more relevant ads to be served by using location information.

What is claimed is:

1. A computer-implemented method comprising:
receiving, using one or more processors, geolocation information associated with an end user request;
determining, using the one or more processors, whether an ad has geolocation-specific information corresponding to the received geolocation information; and
responsive to a determination that the ad has geolocation-specific information corresponding to the received geolocation information,
modifying, using the one or more processors, an ad creative based at least in part on one or more of (A) the geolocation information associated with the end user request, and (B) the geolocation-specific information of the ad, wherein modifying the ad creative includes selecting one of one or more candidate ad creatives,
selecting, using the one or more processors, one of a plurality of candidate ad landing pages based at least in part on the geolocation information, and
providing, using the one or more processors, the modified ad creative on a client device,
otherwise, responsive to a determination, using the one or more processors, that the ad does not have geolocation-specific information corresponding to the geolocation information, providing the ad creative to the client device.

2. The computer-implemented method of claim 1, wherein modifying the ad creative comprises modifying a content of the creative.

3. The computer-implemented method of claim 1, wherein modifying the ad creative comprises inserting geolocation-specific content into the ad creative.

4. The computer-implemented method of claim 1, wherein the geolocation-specific information corresponds to a circular area having a radius about a specified geographic reference point.

5. The computer-implemented method of claim 1, wherein the geolocation-specific information corresponds to an area defined by at least three geographic reference points.

6. The computer-implemented method of claim 1, wherein the geolocation information associated with the end user request and the geolocation-specific information each include at least one of (a) at least one region, (b) at least one state, (c) at least one metro area, (d) at least one city, (e) at least one town, (f) at least one postal zip code, or (g) at least one telephone area code.

7. The computer-implemented method of claim 1, the method further comprising:
responsive to a determination that the ad has geolocation-specific information corresponding to the geolocation information, serving a first ad creative, the first ad creative including a link to the selected one of the plurality of candidate ad landing pages, to provide the first ad creative to the client device.

8. A system comprising:
one or more processors; and
one or more non-transient computer readable storage device storing instructions which, when executed by the one or more processor, cause the one or more processors to perform operations comprising:
receiving, using one or more computers, geolocation information associated with an end user request;
determining, whether an ad has geolocation-specific information corresponding to the geolocation information; and
responsive to a determination that the ad has geolocation-specific information corresponding to the geolocation information,
modifying an ad creative based at least in part on one or more of (A) the geolocation information associated with the end user request, and (B) the geolocation-specific information of the ad, wherein modifying the ad creative includes selecting one of one or more candidate ad creatives,
selecting one of a plurality of candidate ad landing pages based at least in part on the geolocation information, and
providing the modified ad creative on a client device,
otherwise, responsive to a determination that the ad does not have geolocation-specific information corresponding to the geolocation information, providing the ad creative to the client device.

9. The system of claim 8, wherein modifying the ad creative comprises modifying a content of the creative.

10. The system of claim 8, wherein modifying the ad creative comprises inserting geolocation-specific content into the ad creative.

11. The system of claim 8, wherein the geolocation-specific information corresponds to a circular area having a radius about a specified geographic reference point.

12. The system of claim 8, wherein the geolocation-specific information corresponds to one of (A) a circular area having a radius about a specified geographic reference point, or (B) an area defined by at least three geographic reference points.

13. The system of claim 8, wherein the geolocation information associated with the end user request and the geolocation-specific information each include at least one of (a) at least one region, (b) at least one state, (c) at least one metro area, (d) at least one city, (e) at least one town, (f) at least one postal zip code, or (g) at least one telephone area code.

14. The system of claim 8, wherein responsive to the determination that the ad has the geolocation-specific information corresponding to the geolocation information, further comprises:
    serving a first ad creative, the first ad creative including a link to the selected one of the plurality of candidate ad landing pages, to provide the first ad creative to the client device.

15. A non-transitory storage medium storing processor-executable instructions which, when executed by at least one processor, cause the at least one processor to perform operations comprising:
    receiving geolocation information associated with an end user request;
    determining whether an ad has geolocation-specific information corresponding to the geolocation information; and
    responsive to a determination that the ad has geolocation-specific information corresponding to the geolocation information,
        modifying an ad creative based at least in part on one or more of (A) the geolocation information associated with the end user request, and (B) the geolocation-specific information of the ad, wherein modifying the ad creative includes selecting one of one or more candidate ad creatives,
        selecting one of a plurality of candidate ad landing pages based at least in part on the geolocation information, and
    providing the modified ad creative on a client device,
    otherwise, responsive to a determination that the ad does not have geolocation-specific information corresponding to the geolocation information, providing the ad creative to the client device.

16. The non-transitory storage medium of claim 15, storing processor-executable instructions wherein modifying the ad creative comprises modifying a content of the creative.

17. The non-transitory storage medium of claim 15, storing processor-executable instructions wherein modifying the ad creative comprises inserting geolocation-specific content into the ad creative.

18. The non-transitory storage medium of claim 15, storing processor-executable instructions wherein the geolocation-specific information corresponds to a circular area having a radius about a specified geographic reference point.

19. The non-transitory storage medium of claim 15, storing processor-executable instructions wherein the geolocation-specific information corresponds to an area defined by at least three geographic reference points.

20. The non-transitory storage medium of claim 15, storing processor-executable instructions wherein the geolocation information associated with the end user request and the geolocation-specific information each include at least one of (a) at least one region, (b) at least one state, (c) at least one metro area, (d) at least one city, (e) at least one town, (f) at least one postal zip code, or (g) at least one telephone area code.

* * * * *